United States Patent
Bell et al.

(10) Patent No.: US 12,291,791 B2
(45) Date of Patent: *May 6, 2025

(54) STEAM USE AND SAFETY SYSTEMS

(71) Applicant: Bloom Energy Corporation, San Jose, CA (US)

(72) Inventors: Shannon Bell, San Jose, CA (US); Jessica Mahler, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,738

(22) Filed: Jan. 9, 2023

(65) Prior Publication Data
US 2023/0220576 A1 Jul. 13, 2023

Related U.S. Application Data

(60) Provisional application No. 63/297,670, filed on Jan. 7, 2022.

(51) Int. Cl.
| | | |
|---|---|---|
| C25B 15/027 | (2021.01) | |
| C25B 1/042 | (2021.01) | |
| C25B 9/19 | (2021.01) | |
| C25B 9/77 | (2021.01) | |
| C25B 15/08 | (2006.01) | |

(52) U.S. Cl.
CPC ............ C25B 15/027 (2021.01); C25B 1/042 (2021.01); C25B 9/19 (2021.01); C25B 9/77 (2021.01); C25B 15/087 (2021.01)

(58) Field of Classification Search
CPC .......................................... C25B 1/04–1/042
See application file for complete search history.

(56) References Cited

U.S. PATENT DOCUMENTS

| | | | |
|---|---|---|---|
| 8,361,304 B2 * | 1/2013 | Yoshida | C25B 15/08 204/266 |
| 2005/0183948 A1 | 8/2005 | Rusta-Sallehy et al. | |
| 2005/0186458 A1* | 8/2005 | Rusta-Sallehy | C25B 9/17 429/418 |
| 2011/0076573 A1 | 3/2011 | Akikusa et al. | |
| 2016/0068976 A1* | 3/2016 | Yoshida | C25B 9/73 204/265 |

(Continued)

FOREIGN PATENT DOCUMENTS

| | | | | |
|---|---|---|---|---|
| CA | 3165456 A1 * | 8/2021 | ............ | C25B 1/042 |
| CN | 110566807 A * | 12/2019 | ............... | C25B 1/04 |

(Continued)

OTHER PUBLICATIONS

Highsmith et al, Indoor particle concentrations associated with use of tap water in portable humidifiers,Environmental Science Technology, vol. 22, No. 9, Sep. 1988, pp. 1109-1112 (Year: 1988).*

(Continued)

*Primary Examiner* — Harry D Wilkins, III
(74) *Attorney, Agent, or Firm* — THE MARBURY LAW GROUP PLLC

(57) ABSTRACT

A solid oxide electrolyzer cell (SOEC) system including a stack of electrolyzer cells configured to receive water or steam in combination with hydrogen, and a steam recycle outlet configured to recycle a portion of the water or steam.

14 Claims, 5 Drawing Sheets

(56) References Cited

U.S. PATENT DOCUMENTS

| | | | |
|---|---|---|---|
| 2016/0369416 A1* | 12/2016 | Mermelstein | H01M 8/04291 |
| 2016/0377342 A1 | 12/2016 | Mermelstein | |
| 2017/0175277 A1* | 6/2017 | von Olshausen | C25B 9/05 |
| 2018/0069253 A1* | 3/2018 | Chatroux | H01M 8/2425 |
| 2018/0131018 A1* | 5/2018 | Perry | H01M 8/04201 |
| 2018/0287179 A1 | 10/2018 | Rueger et al. | |
| 2019/0376196 A1* | 12/2019 | Mohri | C25B 15/02 |
| 2020/0328436 A1 | 10/2020 | Onuma et al. | |
| 2020/0328445 A1 | 10/2020 | Weingaertner et al. | |
| 2020/0350606 A1 | 11/2020 | Oto | |
| 2021/0071310 A1 | 3/2021 | Oto et al. | |
| 2021/0156038 A1* | 5/2021 | Ballantine | C25B 1/50 |
| 2022/0344683 A1 | 10/2022 | Ancimer et al. | |
| 2023/0015026 A1* | 1/2023 | Ballantine | C01B 3/50 |
| 2023/0046387 A1* | 2/2023 | Peschel | C01B 3/34 |
| 2023/0227991 A1* | 7/2023 | Saeedmanesh | C25B 15/087 |
| | | | 205/349 |

FOREIGN PATENT DOCUMENTS

| | | | |
|---|---|---|---|
| CN | 113278992 A | | 8/2021 |
| CN | 113278992 B | | 8/2021 |
| DE | 102021208732 A1 | * | 2/2023 |
| EP | 3168330 A1 | | 5/2017 |
| EP | 4086370 A2 | | 11/2022 |
| EP | 4086370 A3 | | 11/2022 |
| EP | 4186996 A1 | | 5/2023 |
| EP | 4242350 A1 | | 9/2023 |
| JP | 2021059748 A | | 4/2021 |
| WO | WO 2021/151453 A1 | * | 8/2021 ............ C25B 1/042 |

OTHER PUBLICATIONS

Machine translation of CN-110566807-A (Year: 2019).*
Machine translation of DE-102021208732 A1 (Year: 2023).*
Partial European Search Report dated Jun. 13, 2023 in corresponding European Application No. 23150705.4.
J.E. O'Brien, et al., "A 25 kW high temperature electrolysis facility for flexible hydrogen production and system Integration studies", International Journal of Hydrogen Energy, Elsevier, Amsterdam, NL, vol. 45, No. 32, May 11, 2020 (May 11, 2020), pp. 15796-15804, XP086164464, ISSN: 0360-3199, DOI: 10.1016/J.IJHYDENE.2020.04.074.
Extended European Search Report for European Patent Application No. 23150705.4, mailed Jan. 29, 2024, 15 pages.
O'Brien, J.E et al., "A 25 kW high temperature electrolysis facility for flexible hydrogen production and system integration studies," International Journal of Hydrogen Energy, vol. 45, Issue 32, Jun. 11, 2020, pp. 15796-15804; https://doi.org/10.1016/j.ijhydene.2020.04.074.

* cited by examiner

100

200

300

400

500

STEAM USE AND SAFETY SYSTEMS

FIELD OF THE INVENTION

The embodiments of the present invention generally relate to solid oxide electrolyzer (SOEC) mechanical systems, steam use, and associated safety systems.

BACKGROUND OF THE INVENTION

Electrochemical devices, such as fuel cells, can convert energy stored in fuels to electrical energy with high efficiencies. In a fuel cell system, such as a solid oxide fuel cell (SOFC) system, an oxidizing flow is passed through the cathode side of the fuel cell while a fuel conduit flow is passed through the anode side of the fuel cell. The oxidizing flow is typically air, while the fuel flow can be a hydrocarbon fuel, such as methane, natural gas, liquefied petroleum gas (LPG)/propane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A fuel cell system may include multiple hot boxes, each of which may generate electricity. A hotbox may include a fuel conduit stream that provides oxidizing fuel to one or more fuel stacks, where the fuel is oxidized during electricity generation.

SOFCs may be operated as an electrolyzer in order to produce hydrogen and oxygen, referred to as solid oxide electrolyzer cells (SOEC). SOECs are located in a hotbox. In SOFC mode, oxygen oxide-ions are transported from the cathode side (air) to the anode side (fuel) and the driving force is the chemical gradient of partial pressure of oxygen across the electrolyte. In SOEC mode, a positive potential is applied to the air side of the cell and the oxygen ions are now transported from the steam side to the air side. Since the cathode and anode are reversed between SOFC and SOEC (i.e., SOFC cathode is SOEC anode, and SOFC anode is SOEC cathode), the SOFC cathode (SOEC anode) may be referred to as the air electrode, and the SOFC anode (SOEC cathode) may be referred to as the steam electrode.

During SOEC mode, water in the fuel stream is reduced ($H_2O + 2e^- \rightarrow O^{2-} + H_2$) to form $H_2$ gas and $O^{2-}$ ions, $O_2^-$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.45 V.

SUMMARY OF THE INVENTION

Accordingly, the present invention is directed to various steam use and safety systems that substantially obviates one or more problems due to limitations and disadvantages of the related art.

The embodiments of the present invention operate a SOEC with required safety systems to prevent harm and hazards due to leaking hydrogen or other failures. To operate an SOEC there are mechanical systems and components required to provide the water, air, and start-up fuel required. Safety systems are also included to protect the system, as well as, and more importantly, to protect against fire and other damage to the surroundings and people in proximity. Other SOEC systems may include hazardous location devices, or double containment of fuel components.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments of the invention or the claims.

Values and ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X or +/−5% X. It will be further understood that the endpoints of each of the ranges are significant both in relation to the other endpoint, and independently of the other endpoint. The values and ranges provide examples, but the embodiments of the invention are not so limited.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

In various embodiments of the present embodiments, steam is recycled in the SOEC system.

Figure 1:
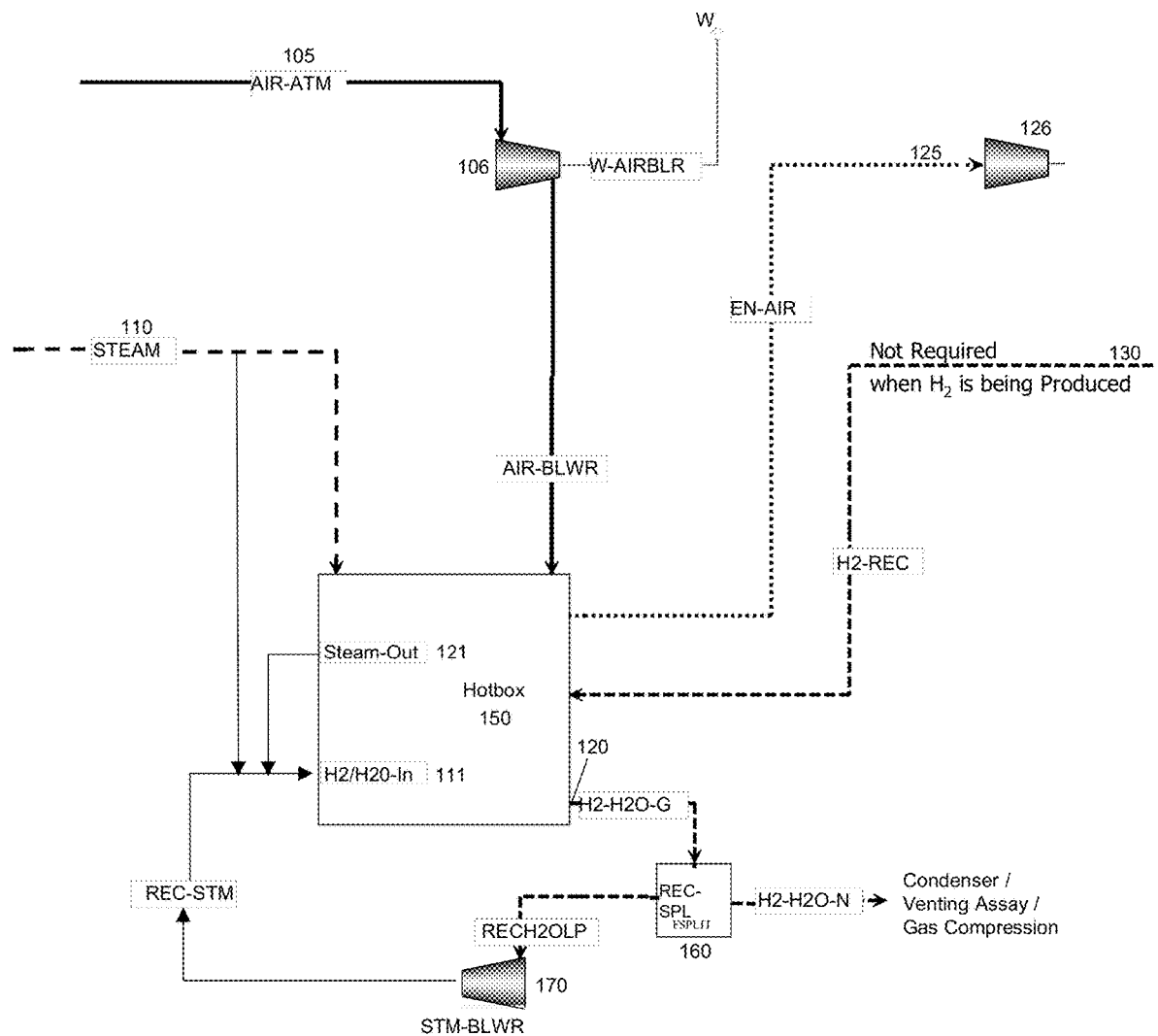
FIG. 1 is an SOEC system process flow diagram according to an example embodiment of the present invention.

FIG. 1 is an SOEC system 100 according to an example embodiment of the present invention.

As illustrated in FIG. 1, SOEC system 100 includes air conduit 105, air blower 106, steam conduit 110, recycle steam inlet 111, recycle steam outlet 121, hotbox 150, optional hydrogen conduit 130, enriched air conduit 125, steam and hydrogen product outlet 120, splitter 160, and steam recycle blower 170.

According to an example configuration and operation, steam input at steam conduit 110 (e.g., supplying site or facility steam at varying pressures) can have a temperature of between about 100° C. and 110° C. (e.g., 105° C.) and a pressure of about 1 psig. In the various embodiments, steam may be input to the SOEC system 100 from an external source or may be generated locally. In some embodiments, multiple steam inlets may be configured to receive external and local steam, respectively. Alternatively, or additionally, water may be input to the SOEC system 100 and vaporized.

Air input (e.g., ambient air) at air conduit 105 may be ambient temperature, perhaps between about −20° C. and +45° C., at the local atmospheric pressure. Air from air conduit 105 is received at air blower 106, and air output by air blower 106 will be a slightly higher temperature than ambient due to the heat of compression. For example, the temperature of air output by air blower 106 may be about 30° C. at 1.0 psig as compared to 20° C. ambient air temperature.

Hydrogen from optional hydrogen conduit 130 may only be required for startup and transients when hydrogen is not being otherwise produced by SOEC system 100. For example, there is no longer a need for a separate hydrogen feed stream or hydrogen recycle steam at steady state. Pressure for this hydrogen stream is a design option determined at the time of site construction, and may be between about 5 psig and 3000 psig. The temperature is likely to be near ambient, as it is likely to be coming from storage.

Air input at air conduit 105, steam input at steam conduit 110, and hydrogen input at optional hydrogen conduit 130 are input to hotbox 150. In turn, hotbox 150 outputs steam and hydrogen product $H_2$—$H_2O$-G at steam and hydrogen product outlet 120 of hotbox 150, where G stands for Gross. Hotbox output $H_2$—$H_2O$-G may have a temperature between about 100° C. and 180° C. (e.g., 130° C.), a pressure of between about 0.1 and 0.5 psig.

In addition, hotbox output $H_2$—$H_2O$-G is input to splitter 160 and is split into a steam recycle stream RECH$_2$OLP, where LP stands for low pressure, and a net product $H_2$—$H_2O$—N, where N stands for Net (e.g., output for commercial use or storage). Here, net product $H_2$—$H_2O$—N may have a temperature between about 100° C. and 180° C. (e.g., 130° C.), a pressure of between about 0.1 psig and 0.5 psig. Steam recycle stream RECH$_2$OLP may have a temperature of between about 100° C. and 180° C. (e.g., 130° C.), a pressure of between about 0.1 psig and 0.5 psig. Hotbox 150 may further output enriched air at enriched air conduit 125 that may have a temperature of between about 120° C. and 300° C., at essentially local atmospheric pressure (e.g., less than 0.5 psig or less than 0.05 psig).

Steam recycle stream RECH$_2$OLP is input to steam recycle blower 170. The resulting recycled steam REC-STM may have a temperature of between about 100° C. and 180° C. (e.g., 140° C.), a pressure between about 0.5 and 1.5 psig (e.g., about 1 psig), and is input into hotbox 150 at recycle steam inlet 111. Additional steam or heat is supplied to recycle steam inlet 111 by steam recycle outlet 121, which captures air exhaust heat (e.g., ~280° C.) of hotbox 150. In some embodiments, there may be no recycled hydrogen feed included with the recycled steam.

As can be understood from FIG. 1, incoming steam temperature at steam conduit 110 (e.g., 105° C.) is low compared with a SOEC configuration with internal steam generation. A plurality of recycle loops can be configured to SOEC systems using both internal steam generation from recycle steam outlet 121 and external steam generation from steam conduit 110. In other words, recycle steam inlet 111 is configured to receive steam from steam conduit 110 and/or recycle steam outlet 121. Here, the embodiments optionally route the facility supplied steam from steam conduit 110, typically saturated and at a temperature of about 105° C., through the internal steam generation coils, one or more vaporizers, and/or other heating elements, and use the air exhaust heat (e.g., ~280° C.) to further heat (i.e., superheat) the steam supply before the heat is released at enriched air conduit 125 through optional fan or enriched air blower 126.

Accordingly, in some embodiments there is approximately, 2-3 kW of energy is available to preheat the steam at recycle steam outlet 121. As a result, the steam temperature into the hotbox is increased to between 140° C. and 160° C.

Figure 2:
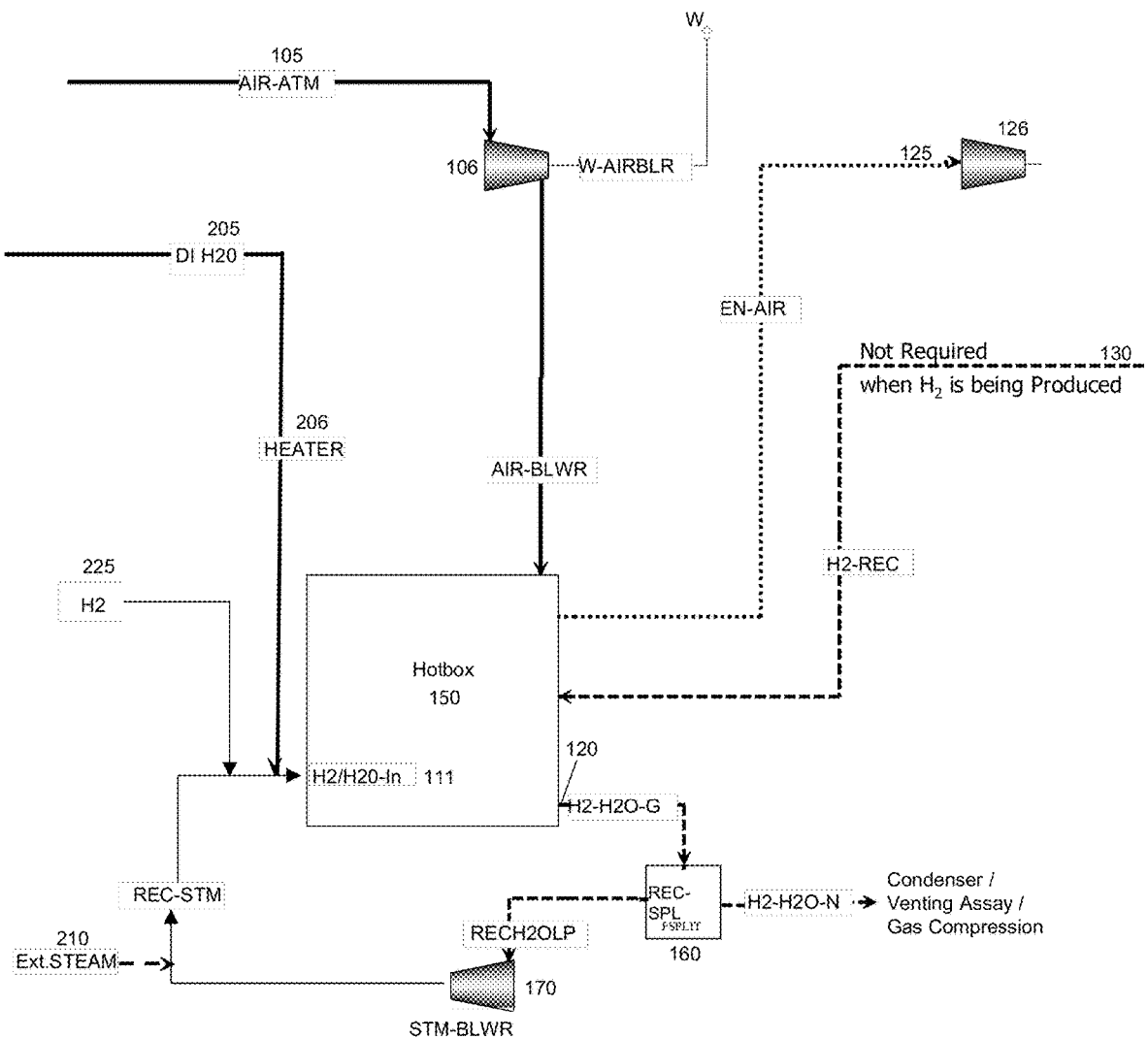
FIG. 2 is an SOEC system process flow diagram according to another example embodiment of the present invention.

FIG. 2 is an SOEC system 200 process flow diagram according to another example embodiment of the present invention. The components of SOEC system 200 are similar to the components of SOEC system 100, as described in connection with FIG. 1, and the differences between systems 200 and 100 will now be described.

In the example embodiment, SOEC system 200 does not require use of input steam conduit 110 and recycle steam outlet 121. Instead, SOEC system 200 utilizes external steam 210 as well as heated deionized water conduit 205. Deionized water of deionized water conduit 205 can be heated by heater 206. Hydrogen is supplied by input hydrogen conduit 225. Each of external steam 210, input hydrogen conduit 225, and heated deionized water conduit 205 are supplied on the recycle loop downstream from steam recycle blower 170, as shown in FIG. 2. The resulting hydrogen and steam product is input at recycle steam inlet 111.

Figure 3:
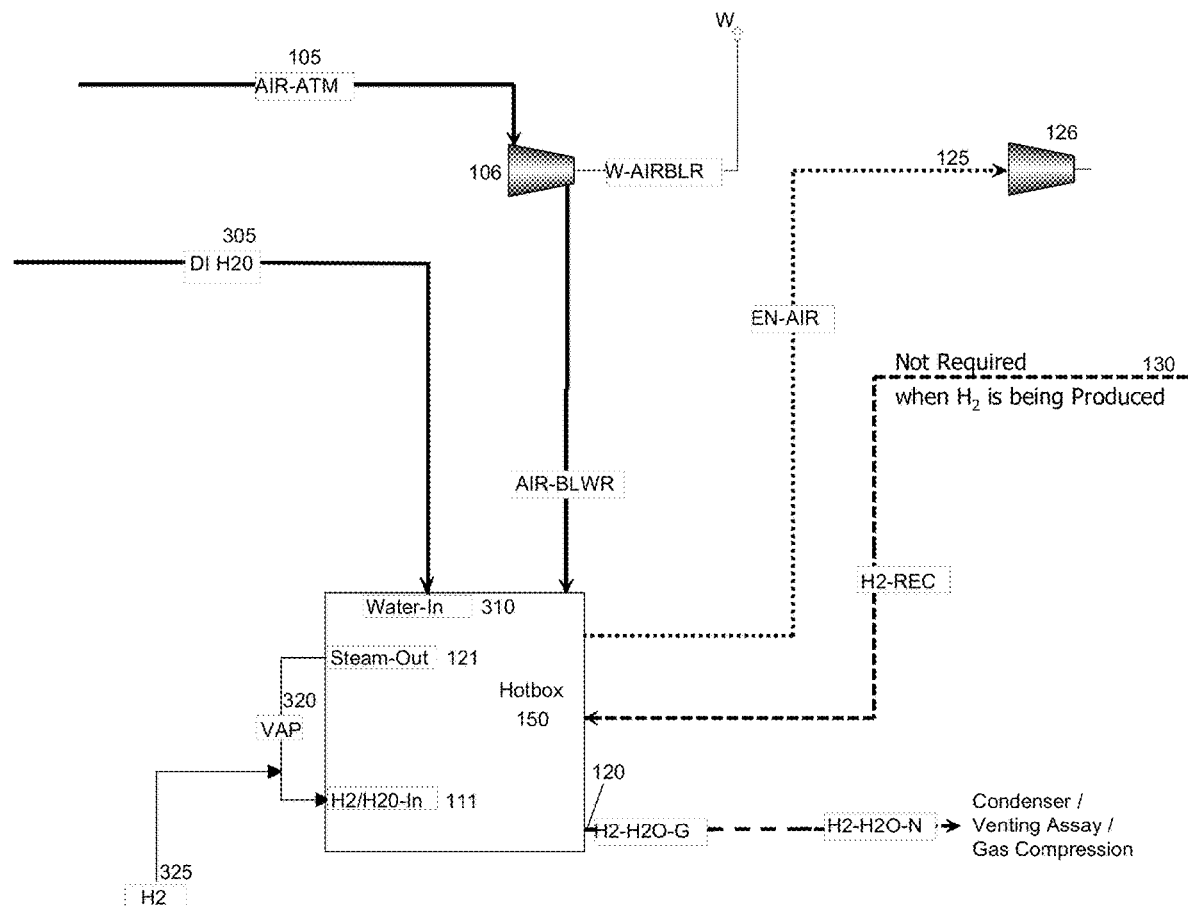
FIG. 3 is an SOEC system process flow diagram according to another example embodiment of the present invention.

FIG. 3 is an SOEC system 300 process flow diagram according to another example embodiment of the present invention. The components of SOEC system 300 are similar to the components of SOEC system 100, as described in connection with FIG. 1, and the differences between systems 300 and 100 will now be described.

In the example embodiment, SOEC system 300 does not require use of input steam conduit 110 as well as the recycle loop by not utilizing splitter 160 and steam recycle blower 170. Instead, SOEC system 300 generates internal steam by heating deionized water of deionized water conduit 305 that is received at water inlet 310. Steam outlet by recycle steam outlet 121 is further heated by vaporizer 320 and mixed with hydrogen of input hydrogen conduit 325. The resulting hydrogen and steam product is input at recycle steam inlet 111, as shown in FIG. 3.

Figure 4:
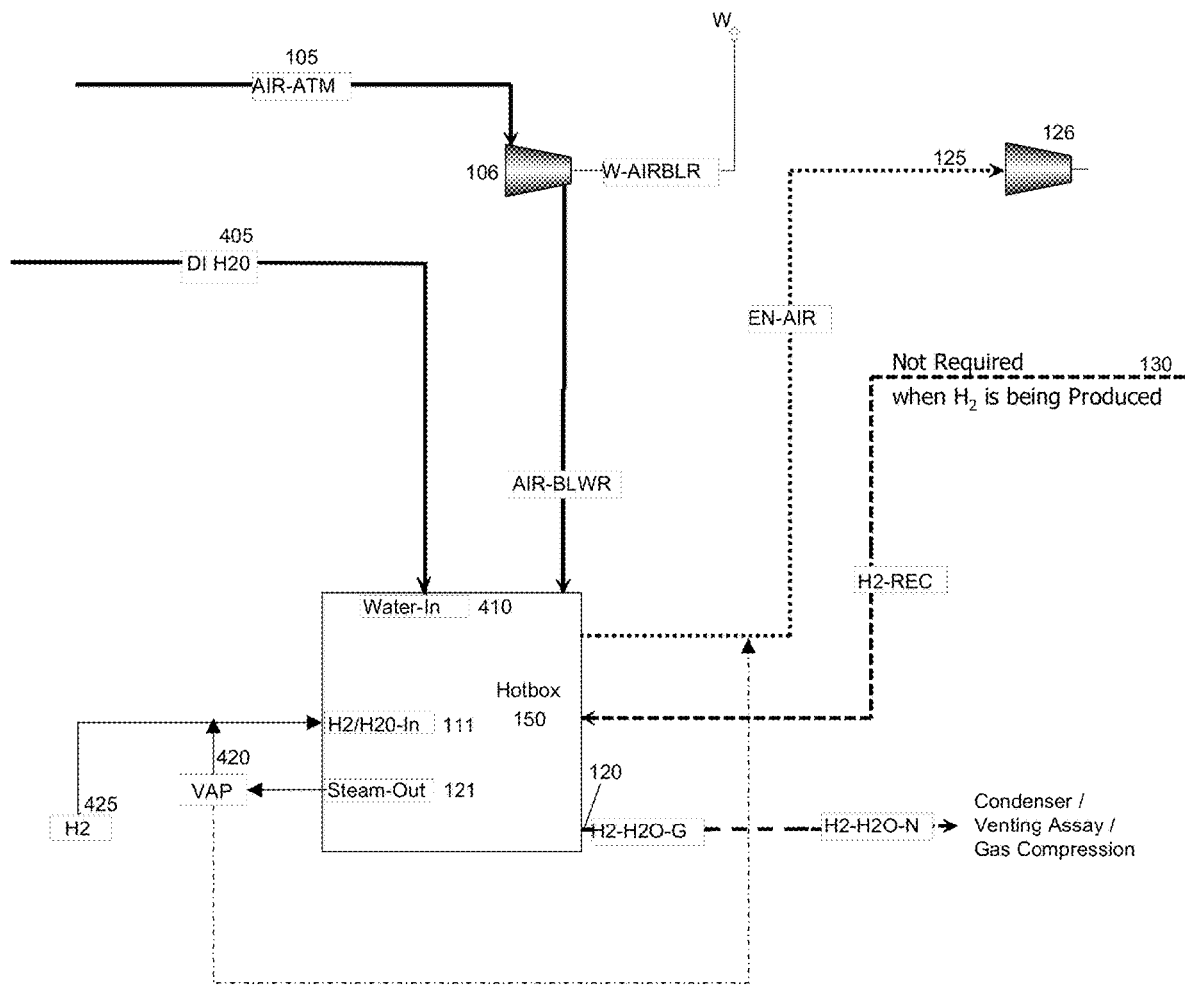
FIG. 4 is an SOEC system process flow diagram according to another example embodiment of the present invention.

FIG. 4 is an SOEC system 400 process flow diagram according to another example embodiment of the present invention. The components of SOEC system 400 are similar to the components of SOEC system 100, as described in connection with FIG. 1, and the differences between systems 400 and 100 will now be described.

In the example embodiment, SOEC system 400 does not require use of input steam conduit 110 as well as the recycle loop by not utilizing splitter 160 and steam recycle blower 170. Instead, SOEC system 400 generates internal steam by heating deionized water of deionized water conduit 405 that is received at water inlet 410. Steam outlet by recycle steam outlet 121 is further heated by vaporizer 420 and mixed with hydrogen of input hydrogen conduit 425. In some configurations, a demister (not shown) is included at the output of vaporizer 420. In some configurations, excess steam can be vented to enriched air conduit 125. The resulting hydrogen and steam product is input at recycle steam inlet 111, as shown in FIG. 4.

Figure 5:
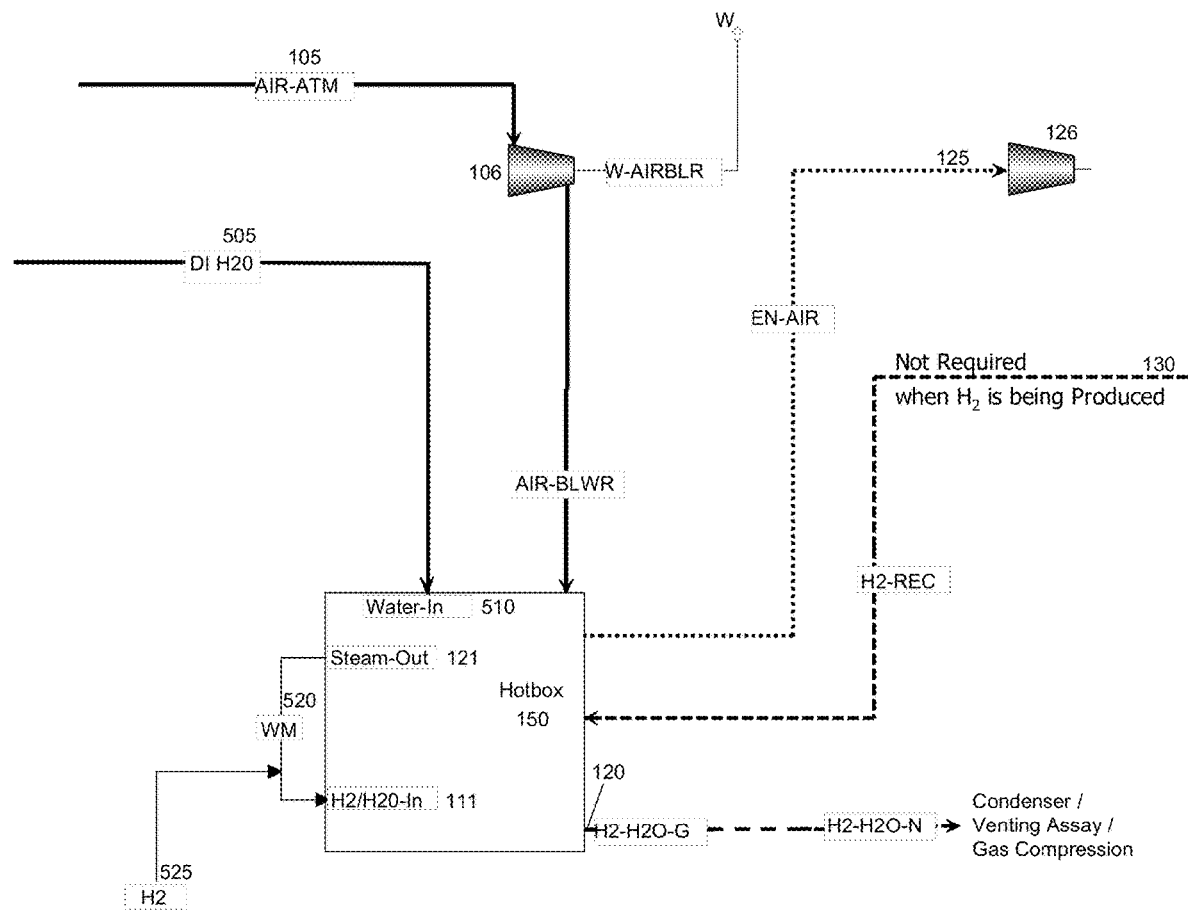
FIG. 5 is an SOEC system process flow diagram according to yet another example embodiment of the present invention.

FIG. 5 is an SOEC system 500 process flow diagram according to yet another example embodiment of the present invention. The components of SOEC system 500 are similar to the components of SOEC system 100, as described in connection with FIG. 1, and the differences between systems 500 and 100 will now be described.

In the example embodiment, SOEC system 500 does not require use of input steam conduit 110 as well as the recycle loop by not utilizing splitter 160 and steam recycle blower 170. Instead, SOEC system 500 generates internal steam by heating deionized water of deionized water conduit 505 that is received at water inlet 510. Steam outlet by recycle steam outlet 121 is regulated by water monitor system 520 (e.g., level transducer float type). Steam released and optionally heated and demisted by water monitoring system 520 is mixed with hydrogen of input hydrogen conduit 525. The resulting hydrogen and steam product is input at recycle steam inlet 111, as shown in FIG. 5.

In each of the various embodiments described herein, one or more detectors can be used to detect a safety event. For example, one or more pressure detectors and one or more thermal detectors can be used. One or more pressure detectors can be placed along input hydrogen conduits (e.g., 225, 325, 425, 525) to detect under pressure (e.g., under 5 PSI) and excess pressure (e.g., over 5 PSI). If a pressure detector is tripped, the system (i.e., hotbox 150) is shutdown. Additionally, one or more thermal detectors can be placed within the cabinet of the hotbox to detect excess heat (e.g., over 230° C.). Cabinet ventilation is provided and maintained by enriched air blower 126, for example. If a thermal detector is tripped, the system (i.e., hotbox 150) is shutdown.

The SOEC system (e.g., 100, 200, 300, 400, 500) cease receiving hydrogen when the SOEC system is operating at steady state or upon detection of a safety event. Additionally, the stack of electrolyzer cells in hotbox 150 can be configured to receive hydrogen when the SOEC system is in startup, shutdown, or when the SOEC system is not producing hydrogen or not producing enough hydrogen.

Accordingly, the various embodiments provide SOEC mechanical systems and associated safety systems. To operate an SOEC there are mechanical systems and components required to provide water, air, and start-up fuel. Safety systems also protect the system against fire and other damage to the surroundings and people in proximity. Operating the SOEC with required safety systems prevents harm and hazards due to leaking hydrogen and/or other failures. Other SOEC systems may include hazardous location devices, or double containment of fuel components.

It will be apparent to those skilled in the art that various modifications and variations can be made in the steam usage and safety systems of the present invention without departing from the spirit or scope of the invention. Thus, it is intended that the present invention cover the modifications and variations of this invention provided they come within the scope of the appended claims and their equivalents.

What is claimed is:

1. A solid oxide electrolyzer cell (SOEC) system comprising:
a stack of electrolyzer cells configured to receive water or steam in combination with hydrogen;
a hydrogen conduit fluidly connected to the stack of electrolyzer cells and configured to provide external hydrogen to the stack of electrolyzer cells when the SOEC system is in startup, and to cease providing the external hydrogen to the stack of electrolyzer cells when the SOEC system is operating at steady state;
a recycle steam inlet;
a hydrogen product outlet fluidly connected to the recycle steam inlet, and configured to recycle a portion of a hydrogen and steam exhaust from the hydrogen product outlet into the recycle steam inlet when the SOEC system is operating at the steady state;
a hotbox that encloses the stack of electrolyzer cells;
an enriched air blower; and
an enriched air conduit fluidly connecting an enriched air outlet of the hotbox to the enriched air blower;
an air blower;
an air conduit fluidly connecting the air blower to an air inlet of the hotbox; and
wherein the stack of electrolyzer cells is configured to cease receiving hydrogen when the SOEC system detects a safety event, and the enriched air blower continues to operate and ventilate a cabinet of the hotbox during the safety event.

2. The SOEC of claim 1, further comprising a steam recycle outlet configured to recycle a portion of the water or steam.

3. The SOEC system of claim 2, wherein steam output by the recycle steam outlet is configured to be mixed with hydrogen and a combination of steam and hydrogen is configured to be supplied to the recycle steam inlet.

4. The SOEC system of claim 2, wherein steam output by the recycle steam outlet is configured to be vaporized, mixed with hydrogen, and supplied to the recycle steam inlet.

5. The SOEC system of claim 2, wherein steam output by the recycle steam outlet is configured to be regulated by a water management system, mixed with hydrogen, and supplied to the recycle steam inlet.

6. The SOEC system of claim 1, further comprising a splitter that supplies a portion of the hydrogen and steam exhaust to a steam recycle blower.

7. The SOEC system of claim 6, wherein a recycled portion of the hydrogen and steam exhaust includes steam and does not include hydrogen.

8. The SOEC system of claim 1, wherein the stack of electrolyzer cells is further configured to receive the external hydrogen when the SOEC system is in shutdown, or when the SOEC system is not producing hydrogen.

9. The SOEC system of claim 1, wherein the safety event is detected by a pressure detector or a thermal detector.

10. The SOEC system of claim 1, wherein a combination of steam, hydrogen, and heated deionized water is configured to be supplied to the recycle steam inlet.

11. The SOEC system of claim 1, wherein the air blower and the enriched air blower are each located outside of the hotbox.

12. A method of operating a solid oxide electrolyzer cell (SOEC) system comprising:

receiving, at a stack of electrolyzer cells, water or steam in combination with hydrogen, wherein the stack of electrolyzer cells is located in a hotbox;

providing air to the stack of electrolyzer cells using an air blower;

providing external hydrogen to the stack of electrolyzer cells at startup of the SOEC system;

ceasing providing the external hydrogen to the stack of electrolyzer cells during steady state operation of the SOEC system; and recycling a portion of a hydrogen and steam exhaust from the stack of electrolyzer cells into the stack of electrolyzer cells during the steady state operation of the SOEC system;

removing enriched air from the hotbox during the steady state operation of the SOEC system using an enriched air blower; and ventilating a cabinet of the hotbox during a safety event using the enriched air blower.

13. The method of claim 12, wherein the enriched air has a temperature between 120 degrees C. and 300 C and a pressure between 0.05 psig and 0.5 psig.

14. The method of claim 12, wherein the air blower and the enriched air blower are each located outside of the hotbox.

* * * * *